(12) United States Patent
Pryce et al.

(10) Patent No.: US 7,361,079 B2
(45) Date of Patent: Apr. 22, 2008

(54) PIPE DEBURRING TOOL

(75) Inventors: John Michael Pryce, Powys (GB); Kathleen Wigley, Powys (GB)

(73) Assignee: Cable Management Products Ltd., Birmingham (GB)

( * ) Notice: Subject to any disclaimer, the term of this patent is extended or adjusted under 35 U.S.C. 154(b) by 0 days.

(21) Appl. No.: 11/677,296

(22) Filed: Feb. 21, 2007

(65) Prior Publication Data

US 2007/0197153 A1    Aug. 23, 2007

(30) Foreign Application Priority Data

Feb. 21, 2006    (GB) ................................ 0603407.8

(51) Int. Cl.
*B24B 23/00*    (2006.01)

(52) U.S. Cl. ...................... 451/344; 451/462; 451/523; 15/104.04; 15/104.05; 15/104.09

(58) Field of Classification Search ................. 451/51, 451/52, 512, 523, 524, 462, 344, 180; 15/104.04, 15/104.03, 104.05, 104.09, 104.095, 104.096
See application file for complete search history.

(56) References Cited

U.S. PATENT DOCUMENTS

| | | | | |
|---|---|---|---|---|
| 3,076,988 A * | 2/1963 | Mills | ............................. | 15/56 |
| 4,678,380 A * | 7/1987 | Zahuranec et al. | ......... | 408/211 |
| 5,038,525 A * | 8/1991 | Gardner | ..................... | 451/439 |
| 5,168,660 A | 12/1992 | Smith | | |
| 5,307,534 A * | 5/1994 | Miller | ............................. | 15/4 |
| 5,791,005 A * | 8/1998 | Grabowski et al. | ...... | 15/104.04 |
| 6,299,518 B1 * | 10/2001 | Daggett | ....................... | 451/344 |
| 6,393,645 B1 * | 5/2002 | Kadinger | ................. | 15/104.04 |
| 6,964,077 B2 * | 11/2005 | Kadinger et al. | ........ | 15/104.03 |
| 2002/0095735 A1 * | 7/2002 | Yehia | ...................... | 15/104.04 |
| 2003/0172481 A1 * | 9/2003 | Yehia | ...................... | 15/104.04 |
| 2004/0200018 A1 * | 10/2004 | Kadinger et al. | ........ | 15/104.04 |

* cited by examiner

*Primary Examiner*—Eileen P. Morgan
(74) *Attorney, Agent, or Firm*—Hahn Loeser + Parks LLP; Scott M. Oldham

(57) ABSTRACT

A pipe deburring tool (1) comprises a deburring means (2) arranged to deburr the inside surface of a pipe and a cleaning means (3) arranged to simultaneously prepare the outside surface of the pipe upon relative rotation of the tool and pipe. The deburring means (2) comprises a prism having rounded longitudinal edges. The cleaning means (3) comprises a plurality of brushes (21) arranged in a housing (4) round the outside of the deburring means (2).

19 Claims, 2 Drawing Sheets

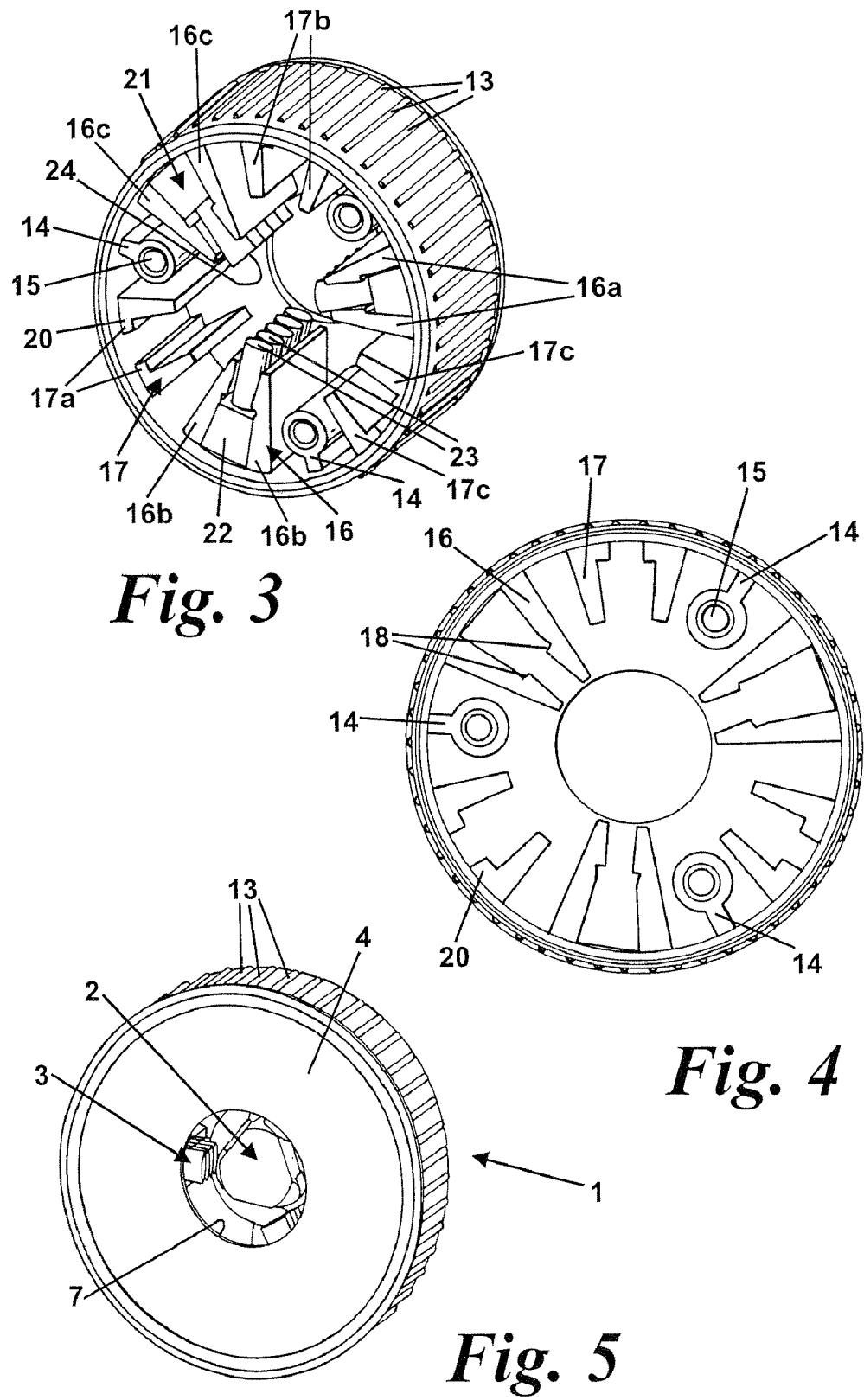

PIPE DEBURRING TOOL

TECHNICAL FIELD

This invention relates to a pipe deburring tool for preparing the end of a pipe.

BACKGROUND OF THE INVENTION

In plumbing applications for example, pipes are cut to size so that they can change direction, terminate or be coupled to other pipes by couplings or connectors. However, when a pipe or tube is cut, such as by trimming, slitting or shearing, burrs form at the pipe end. The burrs can prevent a metal or plastic pipe fitting within its intended receptacle. The burrs on metal pipes in particular could damage a seal within a coupling. To ensure that a cut pipe end fits within a connector or plumbing fitting or forms a reliable seal within a coupling, the end is preferably smooth and free from burrs. Further, burrs can form on both the outside surface adjacent the pipe end and on the inside surface. Thus, it is advantageous to prepare the end of a cut pipe by using a deburring tool.

Pipe preparation tools that deburr a pipe end are known and some of the known tools also chamfer the pipe end. However, the known tools commonly comprise sharp brushes or cutting edges to remove the burrs and injuries to users of such tools are common.

BRIEF SUMMARY OF THE INVENTION

According to a first aspect of the present invention we provide a pipe deburring tool comprising a deburring means arranged to deburr the inside surface of a pipe and a cleaning means arranged to simultaneously prepare the outside surface of the pipe upon relative rotation of the tool and pipe, wherein the deburring means comprises a prism having rounded longitudinal edges.

This is advantageous as it enables a pipe to be prepared fully in a single operation as the inside and outside surfaces of a pipe are deburred and cleaned simultaneously. This makes the task of preparing a pipe quick and easy and the tool itself is easy to manufacture. The prism applies substantially even pressure to spaced locations of the internal surface of the pipe on relative rotation of the pipe and tool. The deburring member thus rolls the burr smooth. The points at which the deburring member does not contact the pipe allow for burrs to fall off, and ensure that the pipe does not become distorted.

On old or existing pipes an oxidized layer or paint can be present on the outside surface. Thus, preferably the cleaning means is arranged to deoxidize the outside surface of the pipe. The cleaning means may have means to deburr the outside surface of the pipe. Thus, the cleaning means is preferably abrasive.

Preferably, the deburring means comprises a deburring member that is adapted to extend within a pipe inserted into the tool. Preferably, the cleaning means comprises at least one brush.

Preferably, the or each brush surrounds the deburring member. Most preferably, the or each brush comprises an elongate strip of brush filaments, the brushes being radially spaced from and longitudinally aligned with the deburring member.

Conveniently the deburring member is a substantially triangular prism. The deburring member is preferably tapered towards its free end. This will aid insertion of a tube over the deburring member. The deburring member may also include a concavely rounded rim opposite the tapered end. Preferably, the deburring member is carried by a base cap. The deburring member is preferably solid and of stainless steel.

Preferably, three brushes are provided. The brushes may be equally angularly spaced around the first deburring means. The brushes are preferably wire brushes.

The or each brush may comprise a base portion having at least one tuft of brush filaments extending therefrom. Preferably, each brush has six tufts of brush filaments extending from the base portion. It will be appreciated that any number of tufts could be provided depending on the size of the tufts or the size of the tool, for example, two, three, four or five tufts. Alternatively, the or each brush may comprise a base portion having a continuous strip of brush filaments extending therefrom.

Preferably, the deburring means and cleaning means are enclosed within a housing having an aperture adapted to receive a pipe. This is particularly advantageous as the deburring means and cleaning means are shielded by the housing, which greatly reduces the likelihood of injury to a user of the tool. The housing is typically of cast metal, but may be of plastics.

According to a second aspect of the invention, we provide a deburring means for the internal surface of a pipe end, the deburring means comprising a member adapted to apply even pressure to the internal surface of the pipe at spaced locations round the internal surface on relative rotation of the pipe and the deburring member.

Such a deburring member is simple to manufacture, but effective in operation, as it applies an even pressure to the internal surface, but at spaced locations rather than over the whole internal surface. This allows for easy removal or rolling down of the burrs, and a smoothing action, without distortion of the pipe.

Preferably the deburring member is a prism having rounded longitudinal edges. A substantially triangular prism is convenient, but any other shape may be used. The deburring member is preferably tapered towards its free end, to aid its insertion into a pipe.

BRIEF DESCRIPTION OF THE DRAWINGS

There now follows by way of example only a detailed description of both aspects of the present invention with reference to the accompanying drawings in which;

FIG. 3 shows a sectional perspective view of an embodiment of the tool where the base-cap is removed;

FIG. 4 shows a plan view of FIG. 3 but with the cleaning means removed; and FIG. 5 shows the embodiment of the pipe deburring tool assembled.

DETAILED DESCRIPTION OF THE INVENTION

The pipe deburring tool 1 shown in the Figures is a hand-held tool for preparing the ends of pipes (not shown). Preparing the pipe involves removing burrs and possibly chamfering the end and removing paint or oxidization. The pipe to be prepared is inserted into the tool 1 where it engages with deburring means 2 and cleaning means 3. The tool 1 is designed to be gripped by the user and rotated relative to the pipe wherein the tool 1 simultaneously removes burrs from the inside surface and prepares the outside surfaces of the pipe adjacent its end.

Figure 1:
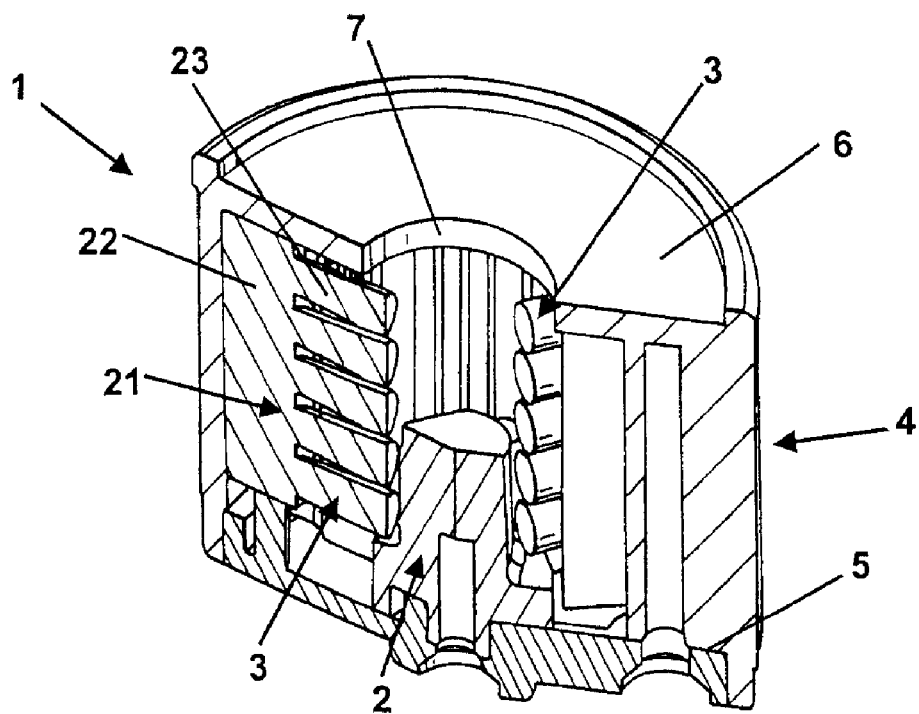
FIG. 1 shows a cut-away view of an embodiment of the tool of the invention.

With reference to FIG. 1 an embodiment of the pipe deburring tool 1 comprises a body 4, in which the cleaning means 3 is mounted. The body 4 comprises a tubular member of circular cross-section having an open end 5 and a closed end 6. The closed end 6 has an aperture 7 therein adapted to receive a tube in use. The body 4 is closed by a base cap 8 that carries the deburring means 2.

Figure 2:
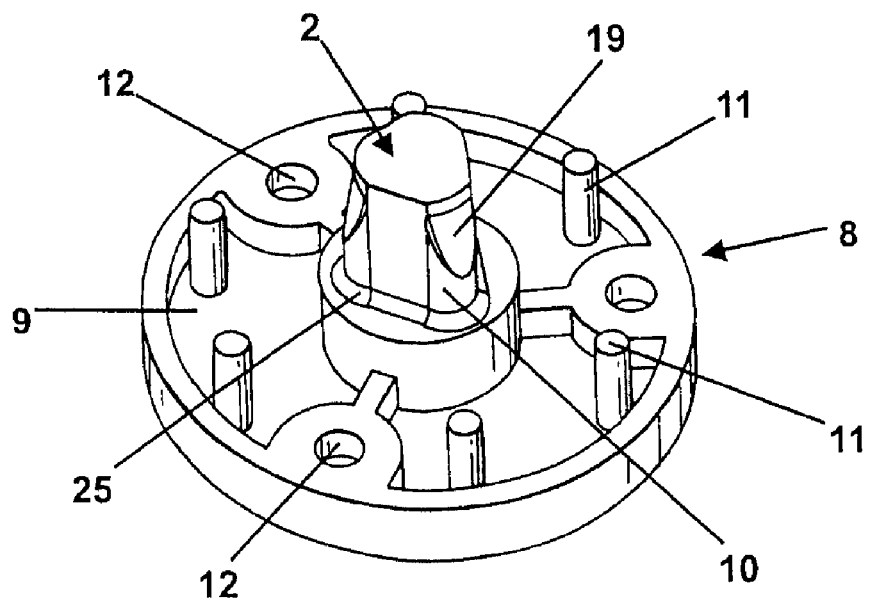
FIG. 2 shows a perspective view of a base cap including the deburring means (the deburring means of the second aspect)

The base cap 8 is shown in FIG. 2 and comprises a circular based 9 having the deburring means 2 depending therefrom. The deburring means 2 is mounted to the centre of the base 9 and is secured thereto by a screw. However it may be secured by friction fit or adhesive or any other suitable means. The deburring means 2 comprises a deburring member that is of solid stainless steel. It has the shape of a triangular prism with rounded longitudinal edges 10. The edges 10 are tapered 19 towards the free end of the deburring means 2 to ease insertion of a pipe despite any turnover of the pipe end following cutting, for example. The tapered part 19 also enables pipes of varying diameter to be inserted over the deburring means 2 until the width of tapered section 19 is sufficient to contact the inside surface of the pipe. The deburring means 2 has, at its junction with the base 9, a concavely rounded rim 25. The base cap 8 also has locating pegs 11 and securing holes 12 to allow screws to pass through and secure the base cap 8 to the body 4 in the appropriate position. The deburring means 2 is sized such that it fits within the end of a pipe and the edges 10 contact its inside surface.

With reference to FIGS. 1, 3 and 4, the body 2 has a plurality of gripping ridges 13 at spaced intervals around its outside surface. The ridges 13 aid the user in gripping the tool 1. Three securing members 14 extend radially inwardly from the inside surface of the body 4. The securing members 14 include apertures 15 for self-tapping screws. The apertures 15 are aligned with the securing holes 12 and are adapted to receive screws to secure the base cap 8 to the body 4. Further, first and second mounting arms 16 and 17 are provided, that also extend radially inwardly, to hold the cleaning means in the body 4. The mounting arms 16 and 17 are equally angularly spaced around the axis of the body 4. The first mounting arms 16 comprise three pairs of fins 16*a*, 16*b*, and 16*c*, each having an enlarged free end to form a retaining ledge 18. The second mounting arms 17 also comprise three pairs of fins 17*a*, 17*b*, 17*c* that extend from the inner wall of the body 4. The fins 17*a*, 17*b*, 17*c* have a base part 20 that extends toward the base part 20 of the other arm 17*a*, 17*b*, 17*c* of the pair. The distance between the fins of each pair 17*a*, 17*b*, 17*c* decreases towards their free ends. The body 4 is integrally moulded with the mounting arms 16, 17 and the securing members 14.

As shown in FIGS. 1 and 3 the mounting arms 16 receive the cleaning means 3. The cleaning means 3 comprises at least one elongate brush 21. The preparation brushes 21 comprise an elongate base portion 22 having a plurality of tufts 23 of wire brush filaments 24 extending therefrom. The tufts 23 are arranged side by side along the base portion 22. The brushes 21 are mounted in the body 4 such that the pair of fins of each mounting arm 16 extends either side of the base portion 22. The retaining ledge 18 abuts the base portion 22 to hold the brush 21 within the arm 16. The brush filaments 24 extend radially inwardly toward the axis of the body 4 from between the mounting arms 16.

The two types of mounting arm 16, 17 allow the same brushes 21 to be mounted in a different position in the body 4 depending on the size of the pipe the tool 1 is intended to prepare. Thus, the same moulding of the body 4 can be used to make tools 1 for different sized pipes. Further, the deburring means 2 may also be sized appropriately depending on the size of the pipe the tool 1 is adapted for.

To assemble the tool 1 the brushes 21 are slid into the mounting arms 16 or 17 and then the base cap 8 is placed over the open end 5. The locating pegs keep the brushes 21 in place and help align the securing holes 12 with the apertures 15 so that screws (not shown) can be used to secure the assembly together. The assembled tool 1 is shown in FIG. 5.

When assembled, the brushes 21 surround the deburring member 2, the space therebetween being for receipt of a pipe end. Thus, in use a pipe is inserted through the aperture 7 into the tool 1. The tapered edges 19 of the deburring member 2 help guide the pipe over the deburring member 2. The pipe is inserted until it contacts the based cap 8, rim 25 or the tapered part 19 of deburring member 2 depending upon the diameter of the pipe. The first deburring means 2 thus extends within the pipe and contacts the internal surface of the tube, while the brushes 21 contact the outside surface of the pipe. The elongate form of the brushes 21 ensures that they contact the pip end no matter how far the tapered deburring member 2 manages to extend with the tube. To deburr and prepare the pipe, the tool 1 and pipe are rotated relative to one another. This causes the deburring member 2 to remove burrs on the inside of the pipe and the brushes 21 to remove and paint, oxidization or burrs on the outside surface simultaneously.

The deburring member 2 operates by applying even pressure to spaced locations of the internal surface of the pipe on relative rotation, to remove or roll down burrs and to smooth out the internal surface of the pipe.

Although the present invention has been described above in detail, the same is by way of illustration and example only and is not to be taken as a limitation on the present invention.

What is claimed is:

1. A pipe deburring tool comprising:
   a housing having an aperture adapted to receive a pipe;
   a deburring device provided in association with the housing and positioned to deburr the inside surface of the pipe by rolling burrs smooth and by applying substantially even pressure to spaced locations of the internal surface of the pipe during relative rotation of the tool and pipe, wherein the deburring device comprises a triangular prism having rounded longitudinal edges, and a cleaning device provided in association with the housing and positioned to simultaneously clean the outside surface of the pipe upon relative rotation of the tool and pipe.

2. A pipe deburring tool according to claim 1, in which the cleaning device deoxidizes the outside surface of the pipe during relative rotation of the tool and pipe.

3. A pipe deburring tool according to claim 1, in which the cleaning device further deburrs the outside surface of the pipe.

4. A pipe deburring tool according to claim 1, in which the cleaning device is abrasive.

5. A pipe deburring tool according to claim 1, in which the deburring device comprises a deburring member that is adapted to extend within the pipe inserted into the tool.

6. A pipe deburring tool according to claim 1, in which the cleaning device comprises at least one brush.

7. A pipe deburring tool according to claim 5, in which the cleaning device comprises at least one brush which surrounds the deburring member.

8. A pipe deburring tool according to claim 7, in which the at least one brush comprises an elongate strip of brush filaments, and the at least one brush being radially spaced from and longitudinally aligned with the deburring member.

9. A pipe deburring tool according to claim 6, in which three brushes are provided.

10. A pipe deburring tool according to claim 7, in which three brushes are equally angularly spaced around the deburring member.

11. A pipe deburring tool according to claim 6, in which the at least one brush is at least one wire brush.

12. A pipe deburring tool according to claim 6, in which the at least one brush comprises a base portion having at least one tuft of brush filaments extending therefrom.

13. A pipe deburring tool according to claim 12, in which the at least one brush has six tufts of brush filaments extending from the base.

14. A pipe deburring tool according to claim 6, in which the at least one brush comprises a base portion having a continuous strip of brush filaments extending therefrom.

15. A pipe deburring tool according to claim 5, in which the deburring member is tapered towards its free end.

16. A pipe deburring tool according to claim 15, in which the deburring member includes a concavely rounded rim opposite the taped end.

17. A pipe deburring tool according to claim 5, in which the deburring member is carried by a base cap.

18. A pipe deburring tool according to claim 5, in which the deburring member is solid and is constructed of stainless steel.

19. A pipe deburring tool according to claim 1, in which the housing includes a base cap adapted to receive the deburring device and includes one or more fins adapted to receive the cleaning device.

* * * * *